United States Patent [19]

Magnusson

[11] 4,060,700
[45] Nov. 29, 1977

[54] TWO-PARTY TELEPHONE SYSTEM

[75] Inventor: Sten Evert Magnusson, Tyreso, Sweden

[73] Assignee: Telefonaktiebolaget L M Ericsson, Stockholm, Sweden

[21] Appl. No.: 690,076

[22] Filed: May 26, 1976

[30] Foreign Application Priority Data

June 13, 1975 Sweden .................................. 7506831

[51] Int. Cl.² ........................ H04M 1/72; H04M 9/00
[52] U.S. Cl. ................................ 179/28; 179/1 CN; 179/1 H
[58] Field of Search .................... 179/27 E, 28, 31, 37, 179/17 E, 99, 1 CN, 1 H, 81 R, 81 C

[56] References Cited

U.S. PATENT DOCUMENTS

| 698,386 | 3/1902 | Adriano | 179/99 |
|---|---|---|---|
| 3,567,868 | 3/1971 | Mukae | 179/37 X |
| 3,931,479 | 1/1976 | Warman et al. | 179/37 |
| 3,941,933 | 3/1976 | Shields | 179/1 H |

FOREIGN PATENT DOCUMENTS

| 301,025 | 1/1915 | Germany | 179/28 |
|---|---|---|---|

*Primary Examiner*—Kathleen H. Claffy
*Assistant Examiner*—E. S. Kemeny

*Attorney, Agent, or Firm*—Hane, Roberts, Spiecens & Cohen

[57] ABSTRACT

The present invention relates to a two-party telephone system intended for external calls to and from each of the telephone sets included in the system, and speech connection between said telephone sets and conference calls between the telephones and an external subscriber. All these facilities are achieved through a two-wire connection between the telephones and require transmission of at least three different information conditions between the extensions included in the system. Each of the telephone sets comprises a visual indicating means $I\alpha$ for busy marking and a voltage source E which by connecting its voltage through the two-wire line activates the device $I\beta$ in the other telephone. An acoustical indicating means BZ which is activated by polarity reverse in said voltage source in the other telephone is also included in order to indicate that the telephone in which the polarity reverse has occurred wishes speech connection. To each telephone in the system is also connected an eavesdrop indicating means $I\beta$ which is activated in both the telephones when the voltage through the control device is increased by series connection of said voltage sources in order to indicate unintentional monitoring and that, at external call, both the telephones are connected respectively.

5 Claims, 1 Drawing Figure

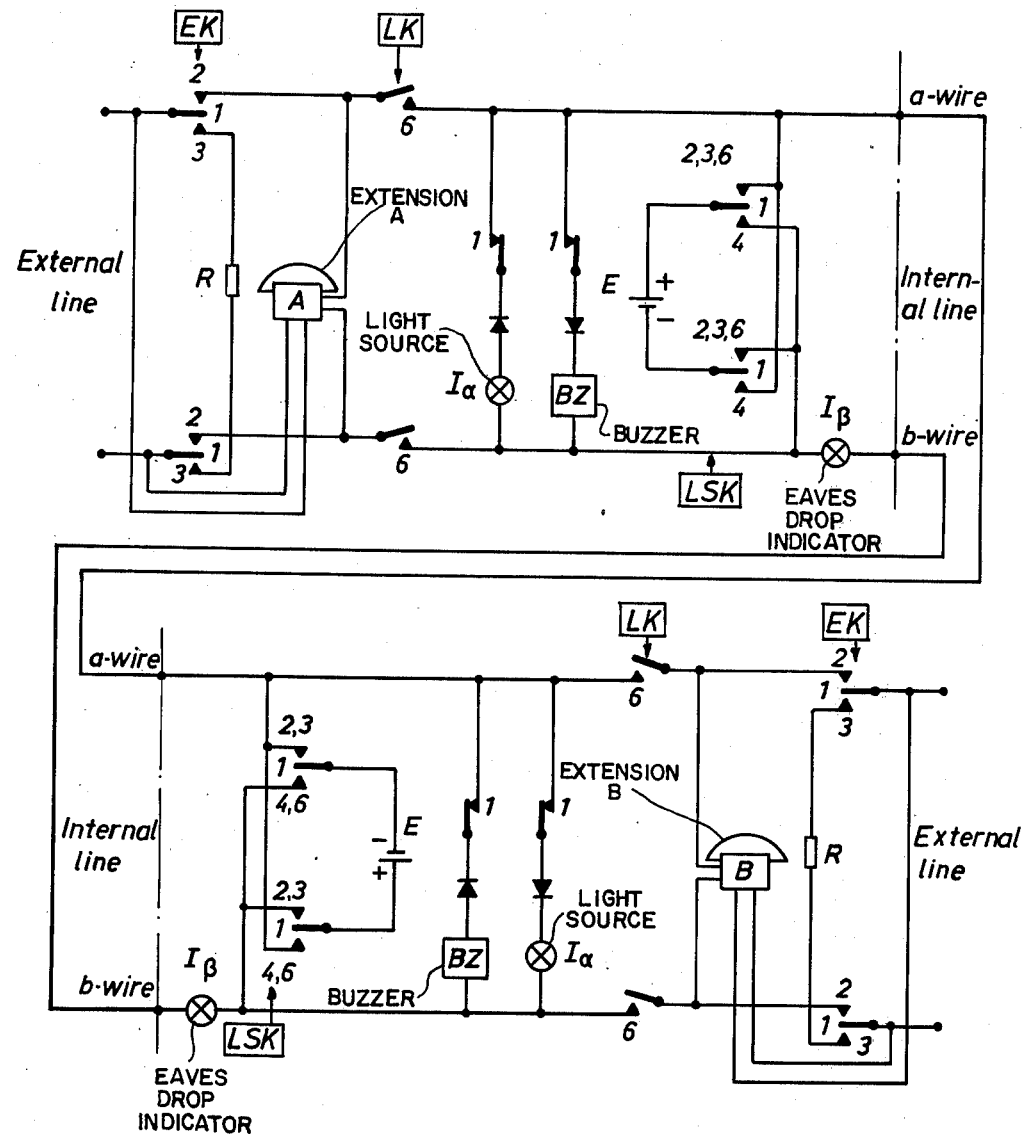

TWO-PARTY TELEPHONE SYSTEM

The present invention relates to a two-party telephone system for making possible external call to and from each of the telephone sets included in the system and internal speech connection between the telephone sets and conference calls between the telephone sets and an external subscriber.

In previously known solutions, for example in the AVH-100 system of LME, a number of wire pairs are generally used for exchange of a number of different signal information.

The purpose of the invention is to achieve a two-party telephone system with only two-wire connection between the telephone sets, and which still make external call with call secrecy through divided external line possible, internal communication inclusively internal inquiry during external calls in progress and conference calls. This requires transmission of at least three different information conditions between the extensions in the two-party telephone system, namely busy marking of the common external line, indication of the conference monitoring and internal ringing signal.

The invention is characterized as appears from the claims enclosed.

The invention will be explained more in detail by means of an embodiment with reference to the accompanying drawing.

On the drawing a circuit diagram is shown from which the function of the telephone system appears.

When any of the extensions A or B are calling or are called through the external line the subscriber picks up the hand set and presses down a bistable external line button EK the contact springs of which occupy contact position 2 according to the diagram, whereby the subscriber is connected to the external line.

Each extension is provided with an own D.C. source E for feeding at internal signalling and marking and at internal calls.

When pressing the external line button EK at for example the A-subscriber also the contact spring group of the belonging D.C. source E is put in position 2, an electric circuit being closed from the positive pole on the voltage source through the a-wire on the internal line through a contact closed in the rest position of the system, a diode and a visual indicating means $I\alpha$ for busy marking which means can be for example a light source such as a glow lamp or a light omitting diode at the other telephone, further through an eavesdrop indicating means $I\beta$ at the B-telephone, the b-wire of the internal line and an eavesdrop indicating means $I\beta$ at the A-telephone to the negative pole of the current source E. By the closing of said current circuit the lamp $I\alpha$ is switched on and tells the B-subscriber that the external line is occupied.

If some one of the subscribers in external call will make an internal inquiry to the other internal subscriber but still will let the external call remain this is carried out in the following manner. Assume that the A-subscriber is the one who speaks through the external line and now wants to make an internal inquiry to the B-subscriber. The external line button EK is pressed to the contact position 3 according to the diagram, a line holding resistance R being switched in and achieves holding for the external line which now has been disconnected from the telephone. The A-subscriber presses down a non-locking internal signalling button LSK which in a pressed down position occupies the contact position 4 in the diagram. In this connection a current path is closed with inverted polarity against the one which activated the lamp $I\alpha$. The current path exceeds from the positive pole of the D.C. source of the A-subscriber through the b-wire of the internal line via the two eavesdrop indicating means $I\beta$ through a D.C. buzzer BZ, a diode and a contact closed in the rest position of the system at the B-subcriber, further through the a-wire of the internal line to the negative pole of the current source of the A-subscriber. The buzzer BZ now is heard and tells the B-subscriber that internal call is desired. The contact function of the current source E at the A-subscriber reverts after finished signalling immediately to the contact position 2. Both the subscribers now switch on the internal line by pressing their internal call buttons LK and therewith close the contact 6 in the diagram. Speech connection is now established through the a- and b-wires of the internal line and the subscribers obtain current feeding from each current source. The A-subscriber returns to the external call by putting the internal line button LK in original position and by putting the contact spring of the external line button EK is position 2. The B-subscriber called at the internal line restores the internal call button by replacing the hand set.

The telephone system allows also conference calls i e the internal subscribers can both be connected through the external line and therewith simultaneously get in contact with on one hand each other and on the other hand an external subscriber. The conference call can be connected in the following manner. One of the internal subscribers are connected to the external line and wishes that also the other internal subscriber is to take part in the call. Internal inquiry is made in a way earlier described. The call subscriber has picked up his hand set and restored his internal line button to original position and now presses his external line button so that the contact spring group is put in position 2. The subscriber is therewith connected to the external line and can take part in the call.

In the above described manner also external calls can be moved from one extension to another. The called internal subscriber who wants to move the call just replaces the hand set after contact being established.

When both the internal subscribers are connected to the external line the two eavesdrop indicating means $I\beta$ are activated. These have the task to indicate monitoring for the subscribers, either unintentional monitoring from the other subscriber or that conference call is going on. The eavesdrop indicating means $I\beta$ which can be constituted of for example glow lamps or lights omitting diodes, are switched on and when the current source E of the internal subscribers are connected in series which occur when both the subscribers have put their external line button EK in contact position 2. The lamps $I\beta$ are so insensitive that they only react for the higher voltage produced by the series-connected current sources.

A discreet signal (preference signal) can be given from an idle subscriber to an occupied subscriber thereby that the idle subscriber intermittent pressures his external line button EK in contact position 2, whereby the lamp $I\beta$ at the occupied subscriber twinkles.

When the external or internal line button of respective telephone is activated the contacts are disconnected for the devices Iα and BZ belonging to the telephone. Closing of the contacts will be obtained in rest position.

External as well as internal line button restores automatically to rest position when the hand set after finished call is replaced.

We claim:

1. In a two-party telephone system utilizing a two-wire line, apparatus for enabling an external call to and from each of two telephone sets included in the system, an internal speech connection between said telephone sets and conference calls between the telephone sets and an external subscriber, said apparatus comprising, in order to achieve transmission of at least three different information conditions between said telephone sets in the system through a two-wire line, for each telephone set a control means, said control means comprising a first indicating means for busy marking connected between the conductors of said two-wire line, a voltage source, switching means for connecting said voltage source to said two-wire line with a first and a second polarity respectively, second indicating means for receiving a calling signal connected to said two-wire line, said first indicating means being responsive to said first polarity on said line and said second indicating means being responsive to said second polarity on said line, means for connecting said voltage sources in series to said two-wire line so that an increased voltage occurs between the two conductors of said two-wire line if both telephone sets are connected to the external line, said control means furthermore comprising third indicating means responsive to said increased voltage.

2. The apparatus of claim 1 wherein one of said indicating means is an acoustical indicating means.

3. The apparatus of claim 1 wherein one of said indicating means is a visual indicating means.

4. The apparatus of claim 1 wherein said first indicating means is a visual indicating means, said second indicating means is an acoustical indicating means, and said third indicating means is an eavesdrop indicating means.

5. The apparatus of claim 4 wherein said visual indicating means is an indicator lamp and said acoustical indicating means is a buzzer.

* * * * *